(12) United States Patent
Dare et al.

(10) Patent No.: US 11,789,484 B1
(45) Date of Patent: Oct. 17, 2023

(54) FOOT PEDAL AND MOBILE MACHINE INCLUDING A FOOT PEDAL

(71) Applicant: Caterpillar Inc., Peoria, IL (US)

(72) Inventors: Jason Rex Dare, Peoria, IL (US); Michael D. Case, Elmwood, IL (US); Mihai Lazaroiu, Peoria, IL (US); Hunter Smalley, Lewis Center, OH (US); Carson Osmond, Piedmont, SC (US); Reid Gramm, Bloomington, IL (US); Tim Carstens, Elmwood, IL (US)

(73) Assignee: Caterpillar Inc., Peoria, IL (US)

( * ) Notice: Subject to any disclaimer, the term of this patent is extended or adjusted under 35 U.S.C. 154(b) by 0 days.

(21) Appl. No.: 17/662,814

(22) Filed: May 10, 2022

(51) Int. Cl.
*G05G 1/44* (2008.04)
*B60T 7/06* (2006.01)
*B60K 26/02* (2006.01)

(52) U.S. Cl.
CPC ............... *G05G 1/44* (2013.01); *B60K 26/02* (2013.01); *B60T 7/06* (2013.01)

(58) Field of Classification Search
None
See application file for complete search history.

(56) References Cited

U.S. PATENT DOCUMENTS

| 2,936,867 | A | * | 5/1960 | Nelson | B60W 10/04 74/513 |
| 4,295,541 | A | * | 10/1981 | Malecha | G05G 1/46 180/315 |
| 5,063,811 | A | * | 11/1991 | Smith | B60K 26/02 338/153 |
| 6,862,950 | B2 | | 3/2005 | O'Neill | |
| 10,946,741 | B1 | | 3/2021 | Kim et al. | |
| 2001/0015111 | A1 | * | 8/2001 | Rixon | G05G 1/38 74/512 |
| 2019/0359318 | A1 | | 11/2019 | Guering et al. | |

FOREIGN PATENT DOCUMENTS

| KR | 101470187 B1 | 12/2014 |
| KR | 20210059858 A | 5/2021 |
| WO | 200360620 A1 | 7/2003 |
| WO | 2020224481 A1 | 11/2020 |

* cited by examiner

*Primary Examiner* — Vicky A Johnson
(74) *Attorney, Agent, or Firm* — Bookoff McAndrews, PLLC

(57) ABSTRACT

A foot pedal for a mobile machine may include a foot support, an arm, and a mounting frame. The arm may have a first end coupled to the foot support and a second end opposite the first end. The arm may have a change in curvature, a concave side, and a convex side opposite the concave side. The mounting frame may be configured to be mounted to a surface extending in a first direction. The convex side may face the surface.

20 Claims, 3 Drawing Sheets

FOOT PEDAL AND MOBILE MACHINE INCLUDING A FOOT PEDAL

TECHNICAL FIELD

The present disclosure relates generally to a foot pedal, and more particularly, to a foot pedal installed in a mobile machine.

BACKGROUND

Foot pedals are used in mobile machines to control engines and/or brakes to move the mobile industrial machine. Foot pedals may be mounted on a vertical wall surface or alternatively on a horizontal floor surface. Floor-mounted pedals typically have a pivot point close to the floor, and the pedal is generally moved downward toward the floor, which can cause strain on a user's ankle. Suspended pedals or wall-mounted pedals typically have a pivot point higher than floor-mounted pedals to allow the pedal to move horizontally toward the wall. Many existing mobile machines, however, have existing hole patterns in a cab floor configured to be arranged with floor-mounted pedals but do not have an existing installation environment for wall-mounted pedals.

WO 2020224481, published Nov. 12, 2020, discloses an electronic accelerator pedal having a hysteresis effect. The accelerator pedal has a foot pedal hinged to a bottom plate at a position close to the floor. In addition, the accelerator pedal has a roller component and dampers for stability. The accelerator pedal disclosed in the '481 publication, however, has similar deficiencies noted above in connection with other floor-mounted pedals.

The foot pedal of the present disclosure may solve one or more problems in the art. The scope of the current disclosure, however, is defined by the attached claims, and not by the ability to solve any specific problem.

SUMMARY

In one aspect, a foot pedal for a mobile machine may include a foot support, an arm, and a mounting frame. The arm may have a first end coupled to the foot support and a second end opposite the first end. The arm may have a change in curvature, a concave side, and a convex side opposite the concave side. The mounting frame may be configured to be mounted to a surface extending in a first direction. The convex side may face the surface.

In another aspect, a foot pedal for a mobile machine may include a foot support, an arm, a support assembly, and a mounting frame. The arm may have a first end coupled to the foot support and a second end opposite the first end. The arm may have a change in curvature, a concave side, and a convex side opposite the concave side. The support assembly may include a main plate, a first roller, and a second roller. The arm may be slidable between the first roller and the second roller in a first direction. The mounting frame may be coupled to the support assembly. The main plate may be moveable relative to the mounting frame, in the first direction, to adjust a position of the main plate with respect to the mounting frame.

In yet another aspect, a mobile machine may comprise a body, a plurality of wheels coupled to the body, and a cab. The cab may include a floor surface and a foot pedal installed at the floor surface. The foot pedal may include a foot support, and arm, a support assembly, and a mounting frame. The arm may be coupled to the foot support. The arm may have a change in curvature. The support assembly may be configured to guide motion of the arm above the floor surface. The mounting frame may be coupled to the support assembly and the floor surface.

BRIEF DESCRIPTION OF THE DRAWINGS

The accompanying drawings, which are incorporated in and constitute a part of this specification, illustrate various exemplary embodiments and together with the description, serve to explain the principles of the disclosed embodiments.

DETAILED DESCRIPTION

Both the foregoing general description and the following detailed description are exemplary and explanatory only and are not restrictive of the features, as claimed. As used herein, the terms "comprises," "comprising," "has," "having," "includes," "including," or other variations thereof, are intended to cover a non-exclusive inclusion such that a process, method, article, or apparatus that comprises a list of elements does not include only those elements, but may include other elements not expressly listed or inherent to such a process, method, article, or apparatus. In this disclosure, unless stated otherwise, relative terms, such as, for example, "about," "substantially," and "approximately" are used to indicate a possible variation of ±10% in the stated value.

Figure 1:
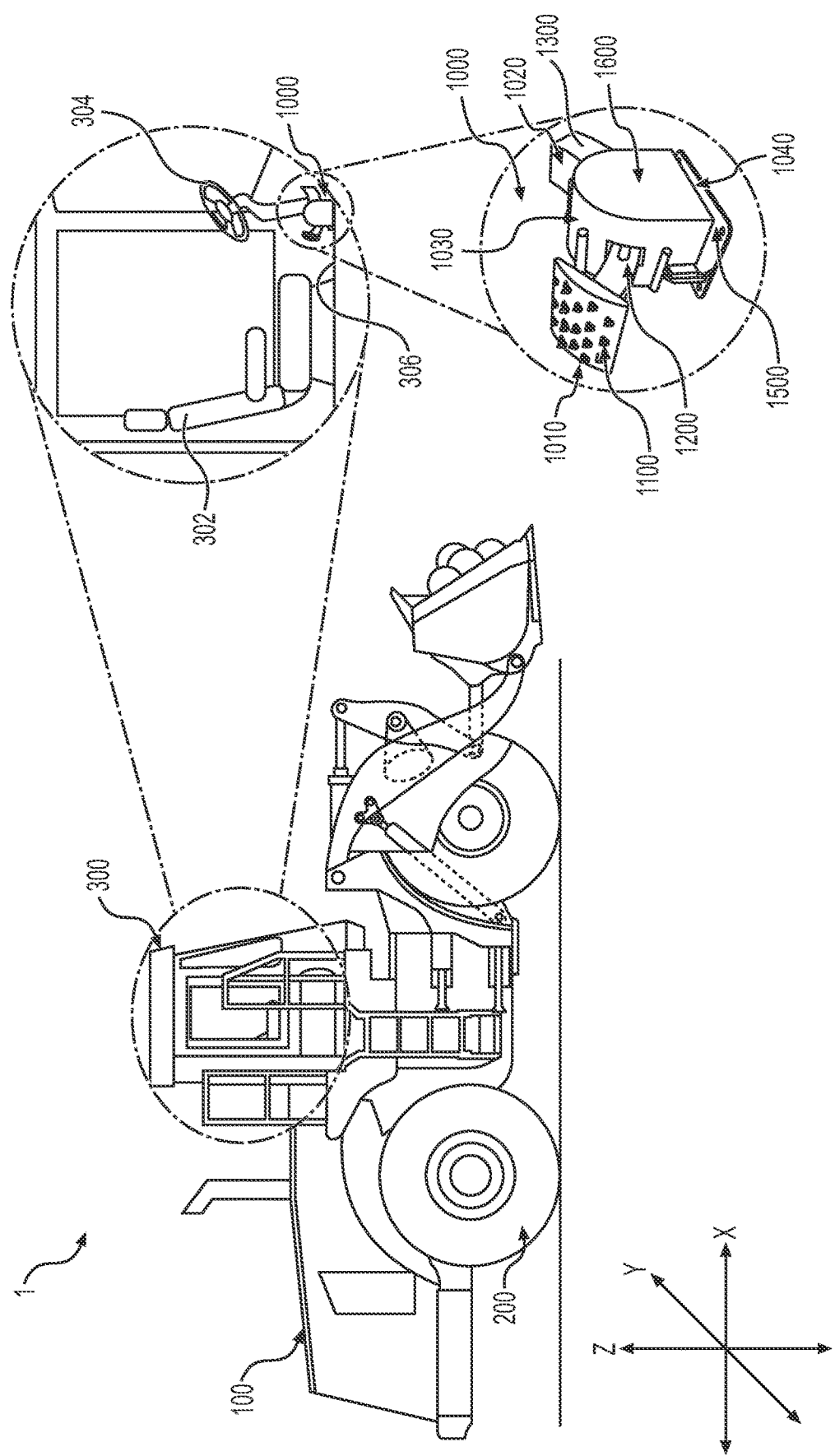
FIG. 1 is a side view of an exemplary mobile industrial machine in the form of a wheel loader, an enlarged view of a cab of the wheel loader, and a further enlarged perspective view of a foot pedal in the cab.

FIG. 1 illustrates a mobile industrial machine 1. The mobile industrial machine 1 could be any industrial machine 1 which moves or is propelled by an engine, such as a compactor, tractor, wheel loader, scraper, haul truck, paver, backhoe loader, etc. For convenience of description, the mobile industrial machine 1 will be described herein as a wheel loader 1.

The wheel loader 1 may include a body 100 housing an engine, hydraulic system, braking system, etc. (not shown), a plurality of wheels 200, and a cab 300. An operator or driver may sit in the cab 300 to control the propelling of the wheel loader 1 via the engine and plurality of wheels 200.

The cab 300 may include a chair 302, a user interface or control assembly 304 (e.g., steering wheel, touchscreen), a floor surface 306, and at least one foot pedal 1000 to assist in regulating fuel to the engine and/or the braking system (e.g., a fuel pedal, a brake pedal, or other pedal configured to send a signal to the engine and/or the braking system to drive the wheel loader 1). The operator may sit in the chair 302 and control various aspects of the wheel loader 1 via the user interface 304 and the foot pedal 1000. The operator may rest a foot on the floor surface 306. The floor surface 306 may lie in a first or horizontal plane, or XY-plane shown in FIGS. 1-2, to extend in a first direction or an X-direction and a second direction or a Y-direction.

Figure 2:
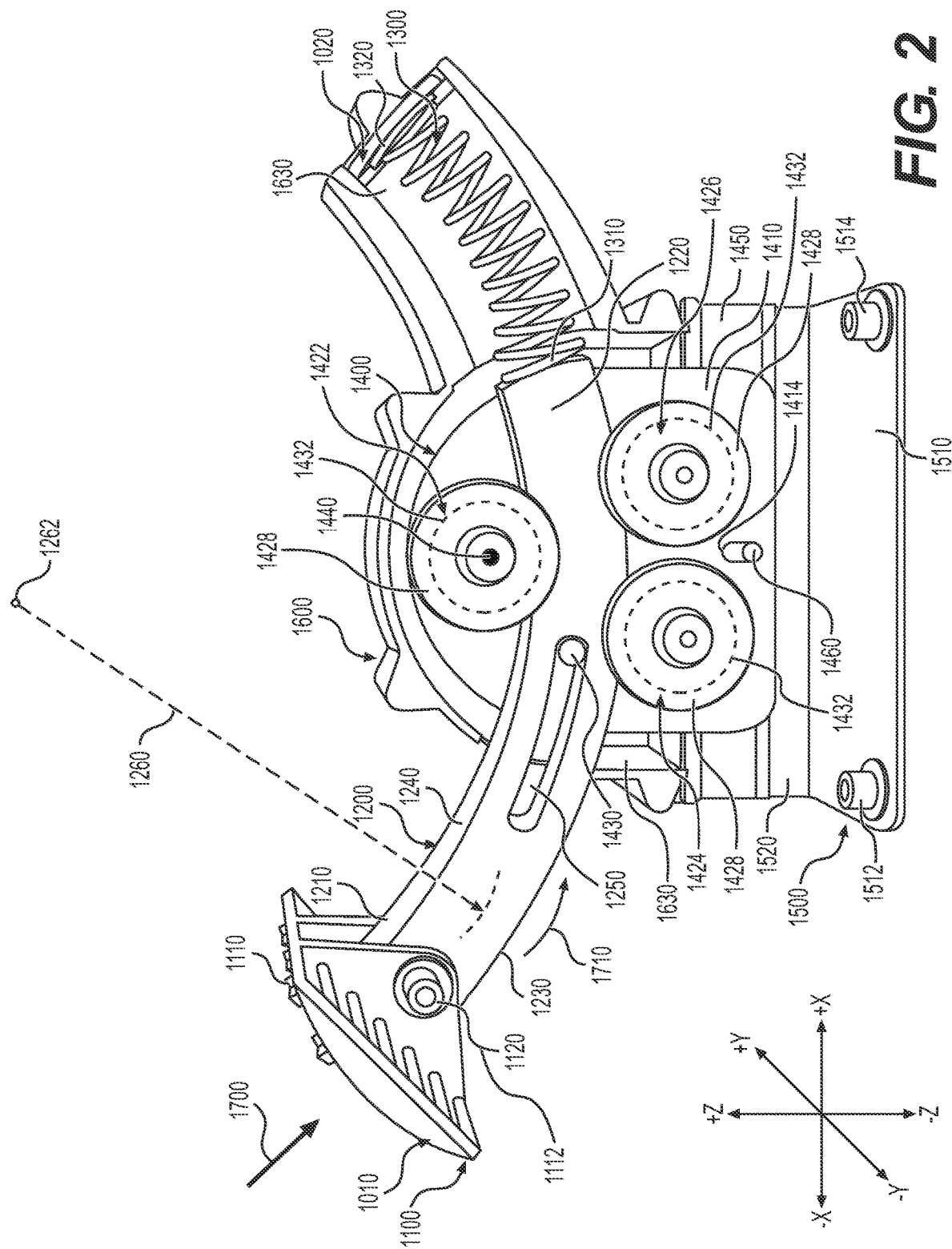
FIG. 2 is a cross-sectional side-view of the pedal of FIG. 1 according to line 2-2 shown in FIG. 3.

The foot pedal 1000 may be installed at the floor surface 306. Referring to FIGS. 1-2, the foot pedal 1000 may include a front end 1010, a back end 1020, an upper end 1030 and a bottom end 1040, a foot support or pad 1100, an arm 1200, a spring 1300, a support assembly 1400, a mounting assembly or frame 1500, and a cover or housing 1600.

The foot support 1100 may include a pedal face or upper surface 1110, a pair of back or bottom flanges 1112, and a coupler or fastener 1120. The pedal face 1110 may include a predetermined texture, material, or other structures (e.g., ribs) to facilitate friction or grip when an operator places his or her foot on the pedal face 1110. The pair of back flanges 1112 may extend from a bottom of the pedal face 1110. The coupler 1120 may connect the back flanges 1112 to the arm 1200. The coupler 1120 may be a hinge (e.g., with a hinge hole and hinge pin) to allow the foot support 1100 to pivot at coupler 1120 with respect to the arm 1200. For example, the coupler 1120 may include a shoulder bolt secured through mating holes formed in the back flanges 1112 and through a first or front end 1210 of the arm 1200.

As shown best in FIG. 2, the arm 1200 may have a change in curvature, such as in an arc shape. The arm 1200 may have the front end 1210, a second or back end 1220, a bottom or convex side or portion 1230, an upper or concave side or portion 1240, an opening or guide slot 1250, a radius of curvature 1260, and a center of curvature 1262. The front end 1210 of the arm 1200 may be provided outside of the housing 1600. The front end 1210 of the arm 1200 may be coupled to the pair of back flanges 1112 via the coupler 1120 such that the arm 1200 is moved toward the back end 1020 of the foot pedal 1000 when the foot support 1100 is moved. The back end 1220 of the arm 1200 may be opposite the front end 1210, provided inside of the housing 1600, and coupled against the spring 1300. The bottom side 1230 may be opposite the upper side 1240 and face the mounting frame 1500 and the floor surface 306 of the cab 300. The bottom side 1230 may be convex with respect to the mounting frame 1500 and the floor surface 306. The upper side 1240 may be concave with respect to a top of the housing 1600, the radius of curvature 1260, and the center of curvature 1262 of the arm 1200. The guide slot 1250 may define a range of motion of the arm 1200 with respect to the support assembly 1400.

The radius of curvature 1260 may extend between the center of curvature 1262 and a center of the arm 1200. The arm 1200 may be between the floor surface 306 of the cab 300 and the center of curvature 1262 in the Z-direction. The radius of curvature 1260 may be configured such that a downward or negative Z-direction of any force applied to the foot support 1100 as shown by arrow 1700 is converted to a circumferential or curved direction along an arc-shaped path of the arm 1200 as shown by arrow 1710, or at least partially in the horizontal or positive X-direction toward the spring 1300. The arc-shaped path of the arm 1200, the radius of curvature 1260, and the center of curvature 1262 may remain above the floor surface 306 of the cab 300 throughout the movement of the arm 1200. The radius of curvature 1260 may be tailored to the dimensions of a human foot, based on how a human foot pivots at an ankle, or based on a distance from a pivot point of the ankle to a ball of the foot (e.g., 50% of the distance from the pivot point of the ankle to the ball of the foot of an average operator). The radius of curvature 1260 may, for example, be in a range of 100-250 millimeters (mm). The radius of curvature 1260 may be provided in the XZ-plane. An arrangement of the radius of curvature 1260 and support assembly 1400 may be configured such that an X-component of the motion of the arm 1200 is greater than a Z-component of the motion such that the arm is moving more or predominantly in the X-direction (forward-rearward) rather than the Z-direction (vertically).

The spring 1300 may be a coil spring. The spring 1300 may have a first or forward end 1310 and a second or back end 1320 opposite the first end 1310. The forward end 1310 of the spring 1300 may be coupled to the back end 1220 of the arm 1200, and the back end 1320 of the spring 1300 may be coupled to an inner surface of the housing 1600. As the arm 1200 is moved along the arc path or in the circumferential direction shown by arrow 1710, the spring 1300 may become compressed. When the force applied to the foot support 1100 is released, the spring 1300 may provide a restoring force to move the arm 1200 in a direction opposite to the direction shown by arrow 1710 (with at least one component of motion in the negative X-direction). Configurations of the spring 1300 are not limited, and the spring 1300 may be any elastic member that has a restoring force sufficient to move the arm 1200. For example, the spring 1300 may be an accordion spring, or another type of compression spring, or the arm 1200 and housing 1600 could be reconfigured to accommodate an extension spring urging the arm 1200 to the position shown in FIG. 2.

The support assembly 1400 may guide the movement of the arm 1200. The support assembly 1400 may include a main plate 1410, a connection plate or rail 1450 coupling the main plate 1410 to the mounting frame 1500, and a locking or adjustment pin 1460 to facilitate an adjustment of a position of the foot support 1100 for the operator.

The main plate 1410 may extend in a second or vertical plane (XZ-plane in FIG. 2) perpendicular to the first plane in which the floor surface 306 lies. The main plate 1410 may have a rectangular shape at a bottom side and a semicircular shape at an upper side, but aspects disclosed herein are not limited to a shape of the main plate 1410. The main plate 1410 may include at least one pin or peg hole 1414 and may be configured to support a plurality of rollers 1422, 1424, 1426, a guide pin 1430, and a sensor 1440. The main plate 1410 may have a connector (e.g., a T-shaped track piece, not shown) rigidly coupled to a rear side. The T-shaped connector may be configured to fit within and slideably couple or engage with a rail-shaped (e.g., C-shaped) recess or contour of the connection rail 1450 such that the main plate 1410 is configured to move in the X-direction with respect to the mounting frame 1500. The pin hole 1414 may be configured to receive the locking pin 1460 to set a position of the main plate 1410 with respect to the connection rail 1450 and mounting frame 1500.

The plurality of rollers 1422, 1424, and 1426 may be rotatably coupled to the main plate 1410. The plurality of rollers 1422, 1424, and 1426 may be hydraulic rings or radius rollers, but aspects disclosed herein are not limited. For example, each of the plurality of rollers 1422, 1424, and 1426 may be in a bobbin shape, having a pair of outer flanges 1428 and an inner or central shaft 1432 (shown in dashed lines in FIG. 2). The central shaft 1432 may be surrounded by a rubber sleeve. During movement of arm 1200, the lower and upper sides 1230, 1240 thereof contact the rubber sleeves to rotate the rollers 1422, 1424, and 1426 and guide the arm 1200 as it moves along an arc-shaped path. The flanges 1428 of the rollers 1422, 1424, and 1426 may maintain a position of the arm 1200 in the Y-direction.

The plurality of rollers 1422, 1424, and 1426 may include a first roller 1422, a second roller 1424, and a third roller 1426. The first roller 1422 may be an upper roller provided above the arm 1200 and configured to engage with the upper side 1240 of the arm 1200. The second roller 1424 and the third roller 1426 may be lower rollers provided below the arm 1200 and configured to engage with the bottom side 1230 of the arm 1200. The arm 1200 may move between the first roller 1422 and the second and third rollers 1424 and 1426. As the arm 1200 is moved in the direction of arrow 1710 (such that a component of motion occurs in the +X direction), the first roller 1422 may be turned in a counter-clockwise direction, and the second and third rollers 1424 and 1426 may be turned in in a clockwise direction. When the arm 1200 is moved in a direction opposite the direction of arrow 1710 (such that a component of motion occurs in the —X-direction), the first roller 1422 may be turned in a clockwise direction, and the second and third rollers 1424 and 1426 may be turned in a counterclockwise direction.

The guide pin 1430 may extend through the guide slot 1250 of the arm 1200 to limit a movement of the arm 1200 in the X-direction. As the arm 1200 is moved in the direction of arrow 1710, an end of the guide slot 1250 may contact or abut the guide pin 1430, and the arm 1200 may be prevented from moving further. Similarly, as the arm 1200 is moved in the direction opposite to arrow 1710, an opposite end of the guide slot 1250 may contact or abut the guide pin 1430, and the arm 1200 may be prevented from moving further. The dimensions of the guide slot 1250 of the arm 1200 may be configured based on a predetermined range of motion of the arm 1200. The guide pin 1430 may alternatively be referred to as a stopper.

The sensor 1440 may sense a movement of the arm 1200. As an example, the sensor 1440 may be provided on the first roller 1422 (e.g., in the shaft or core 1432 of the first roller 1422) to sense a rotational movement of the first roller 1422. The sensor 1440 may be a rotary position sensor configured to provide electrical feedback based on the rotational movement of roller 1422, but aspects disclosed herein are not limited. Although the sensor 1440 is shown in FIG. 2 on the first roller 1422 facing the —Y direction, as an alternative example, the sensor 1440 may be provided on an opposite side of the first roller 1422 that faces the +Y direction, or on any other roller. A position or configuration of the sensor 1440 is not limited, however. As another alternative example, at least one gear and/or a gearbox having a plurality of mating gears may be configured to engage with at least one of the rollers 1422, 1424, and 1426 and rotate based on a rotation of the rollers 1422, 1424, and 1426, and the gear may include the sensor 1440, which may sense a rotational movement of the gear.

Figure 3:
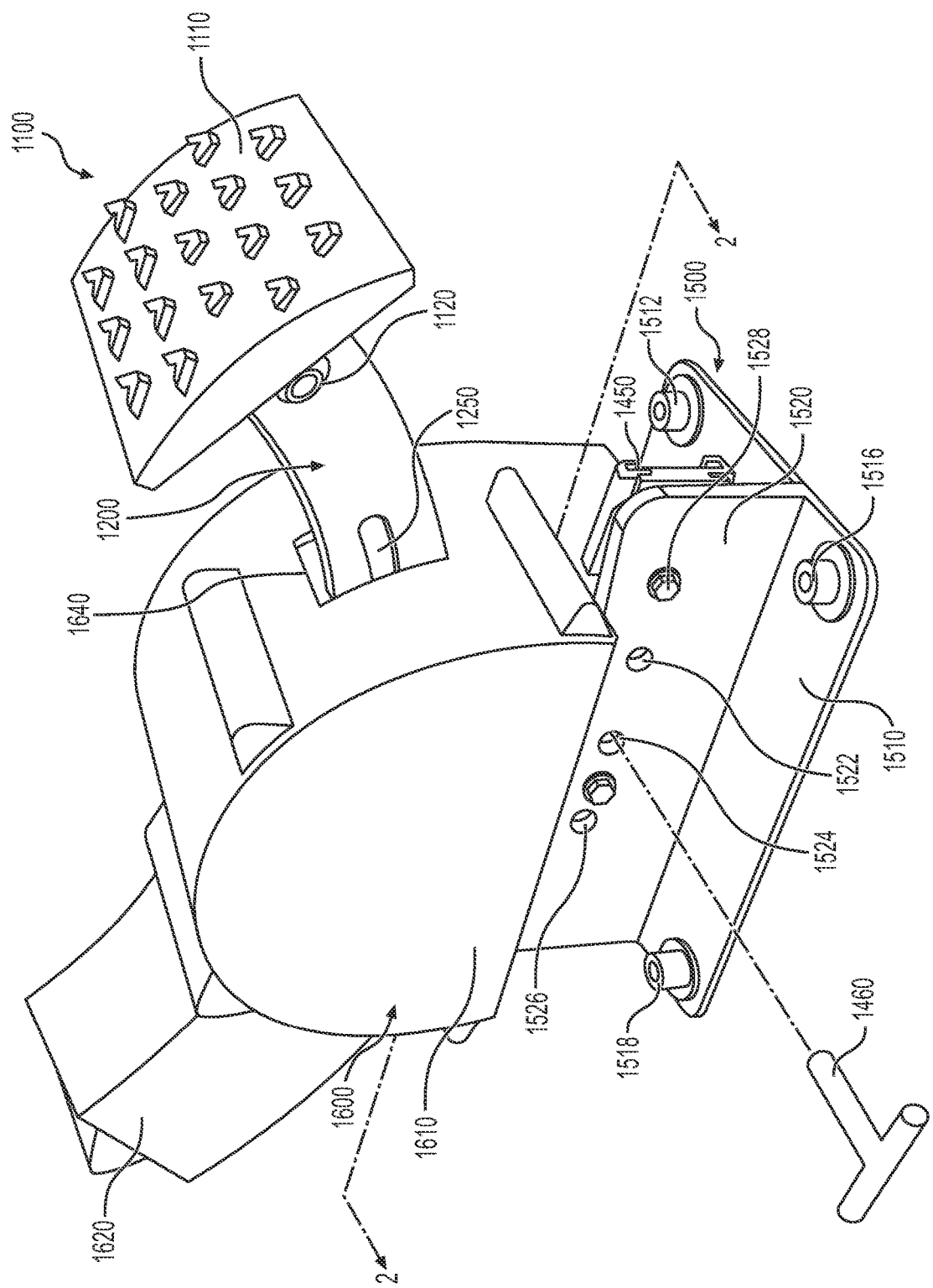
FIG. 3 is a perspective view of the pedal of FIG. 1.

Referring to FIGS. 2-3, the connection rail 1450 may be bolted or screwed via one or more fasteners 1528 to the mounting frame 1500 and may be slideably coupled with the main plate 1410. A front side of the connection rail 1450 may have the rail-shaped or recessed contour, which may be shaped and/or configured (e.g., C-shaped) to receive the connector (e.g., T-shaped connector) at the rear of the main plate 1410. The connection rail 1450 may include a plurality of pin holes configured to align with a plurality of pin holes 1522, 1524, and 1526 (FIG. 3) of the mounting frame 1500 and configured to receive the locking pin 1460.

The locking pin 1460 may be a T-shaped pin, bolt, screw, or other elongated structure. The locking pin 1460 may be received in the pin hole 1414 of the main plate 1410, the plurality of pin holes of the connection rail 1450, and the plurality of pin holes 1522, 1524, 1526 in the mounting frame 1500 (FIG. 3) to secure the support assembly 1400 to the mounting frame 1500, and may be removed so that a position of the main plate 1410 in the X-direction relative to the connection rail 1450 and the mounting frame 1500 may be adjusted based on the operator's preference and/or leg length.

The mounting frame 1500 may mount the support assembly 1400 to an installation surface, such as the floor surface 306 of the cab 300. The mounting frame 1500 may have a first or horizontal plate 1510 and a second or vertical plate 1520.

The first plate 1510 may extend in the XY-plane to be parallel to the floor surface 306 of the cab 300 (FIG. 1). The first plate 1510 may have a plurality of mounting holes configured to receive a plurality of fasteners 1512, 1514, 1516, 1518 e.g., via bolts, screws, studs, etc. to couple the first plate 1510 to the floor surface 306. As an example, the first plate 1510 may have a rectangular shape, and the plurality of mounting holes for the plurality of fasteners 1512, 1514, 1516, 1518 may include a first mounting hole for a first fastener 1512, a second mounting hole for a second fastener 1514, a third mounting hole for a third fastener 1516, and a fourth mounting hole for a fourth fastener 1518 formed at corners of the first plate 1510.

The second plate 1520 may extend in the ZY-plane to be perpendicular to the floor surface 306 of the cabin 300 (FIG. 1). The second plate 1520 may be fixed to (e.g., welded to, fused to, or formed integrally with) the first plate 1510. The second plate 1520 may be formed with the plurality of pin holes 1522, 1524, 1526 at positions configured to align with the plurality of pin holes of the connection rail 1450. The plurality of pin holes 1522, 1524, 1526 may include a first pin hole 1522, which the pin hole 1414 of the main plate 1410 may be aligned to provide a rearward-most position of the foot pedal 1000, a second pin hole 1524, which the pin hole 1414 of the main plate 1410 may be aligned with in an intermediate position, and a third pin hole 1526, which the pin hole 1414 of the main plate 1410 may be aligned with in a forward-most position. The second plate 1520 may be fixed or secured via the one or more fasteners 1528 to the connection rail 1450 at positions between or adjacent to the plurality of pin holes 1522, 1524, 1526, while the main plate 1410 may be configured to move in the X-direction with respect to the second plate 1520. The locking pin 1460 may maintain a position of the main plate 1410 with respect to the second plate 1520 when inserted through the pin hole 1414 of the main plate 1410 and one of the pin holes 1522, 1524, 1526 of the second plate 1520.

Referring still to FIGS. 2-3, the housing 1600 may be made out of a rigid material (e.g., plastic or metal) to cover and protect at least a portion of the support assembly 1400, at least a portion of the arm 1200, and the spring 1300 from outside substances (e.g., mud). The housing 1600 may be formed as multiple casings or sections (e.g., left and right casings) that are configured to be coupled (e.g., snap fitted, screwed, or bolted) together around the support assembly 1400, but aspects disclosed herein are not limited to a construction of the housing 1600. The housing 1600 may have a first portion or section 1610, a section portion or section 1620, an inner space 1630, and an opening 1640 communicating with the inner space 1630.

The first portion 1610 of the housing may cover at least a portion of the main plate 1410, the plurality of rollers 1422, 1424, 1426 of the main plate 1410, the sensor 1440, the guide pin 1430, and at least a portion of the guide slot 1250 of the arm 1200. A cross-sectional shape of the first portion 1610 may correspond to a covered cross-sectional shape of the main plate 1410. For example the cross-sectional shape of the first portion 1610 may have a semi-circular shape. The connection rail 1450, along with a corresponding section of the main plate 1410 coupled to the connection rail 1450, may be exposed under the first portion 1610 of the housing 1600. The second portion 1620 of the housing 1600 may be configured to cover the spring 1300. The second portion 1620 of the housing 1600 may have an arc shape having a radius of curvature corresponding to the radius of curvature 1260 of the arm 1200 so as to be configured to receive the arm 1200 during movement.

The housing 1600 may be primarily hollow to have the inner space 1630. The portion of the main plate 1410, the plurality of rollers 1422, 1424, 1426 of the main plate 1410, the sensor 1440, the guide pin 1430, the spring 1300, and at least a portion of the guide slot 1250 of the arm 1200 may be provided in the inner space 1630.

The opening 1640 may be configured to receive the arm 1200 to allow the arm 1200 to move into and out of the housing 1600. A cross-sectional area of the opening 1640 may be smaller than a corresponding cross-sectional area of the foot support 1100.

INDUSTRIAL APPLICABILITY

The disclosed aspects of the foot pedal 1000 may be configured to control an engine, brake, or other driving devices of a mobile industrial machine 1 (e.g., wheel loader) in a way that is comfortable for the operator. The disclosed aspects of the foot pedal 1000 may allow the foot pedal 1000 to be mounted on a floor (e.g., floor surface 306 of the cab 300) and installed with preexisting openings configured to be arranged with floor-mounted pedals, but may move in a direction different from a direction in which typical floor-mounted pedals move and instead may move in a predominately horizontal direction to be comfortable for an operator. An arrangement of the housing 1600, the support assembly 1400, and the arm 1200 may reduce or prevent substances from sticking the arm 1200 or foot support 1100 (e.g., mud) to allow a smoother motion.

Referring to FIGS. 1-3, the operator may press his or her foot against the pedal face 1110 to apply a force on the pedal face 1110 in the direction of arrow 1700 and toward the back end 1020 of the foot pedal 1000. The operator may rest his or her foot against the pedal face 1110, and the operator's foot may be guided, via a shape of the arm 1200 and an arrangement of the plurality of rollers 1422, 1424, and 1426 on the support assembly 1400, in an ergonomically pleasing direction indicated by arrow 1710, which may be predominantly horizontal in the X-direction.

The motion of the foot support 1100 and arm 1200 in the direction of arrow 1710 may cause a signal to be sent to and/or fluid to be released to the engine and/or the brake. As the arm 1200 is moved inside of the inner space 1630 of the housing 1600, the arm 1200 compresses the spring 1300, and the sensor 1440 may sense how far the arm 1200 has moved and/or a speed of the arm 1200 based on a rotation of (e.g., number of rotations and/or a rotational speed of) the first roller 1422. The guide pin 1430 may limit the motion of the arm 1200 via the guide slot 1250 to define a fully depressed pedal position when a front end of the guide slot 1250 abuts the guide pin 1430.

When the operator releases his or her foot against the pedal face 1110, the spring 1300 may be restored to an initial state, and the elastic restoring force of the spring 1300 may move the arm 1200 in a direction opposite to arrow 1710 back toward an outside of the housing 1600 and toward the front end 1010 of the foot pedal 1000 to an initial position. The guide pin 1430 may limit the motion of the arm 1200 to define a fully extended pedal position when a rear end of the guide slot 1250 abuts the guide pin 1430. The shape of the arm 1200 and an arrangement of the plurality of rollers 1422, 1424, and 1426 on the support assembly 1400 may be configured such that the foot support 1100 and the arm 1200 do not touch the floor surface 306 of the cab 300.

An aft adjustment may be quickly accomplished by adjusting a position of the main plate 1410 of the support assembly 1400 with respect to the second plate 1520 of the mounting frame 1500 via the locking pin 1460. The operator may remove locking pin 1460 from the main plate 1410, connection rail 1450, and mounting frame 1500, move a position of the support assembly 1400 so that the pin hole 1414 of the main plate 1410 aligns with different pin holes pin holes 1522, 1524, 1526 of the mounting frame 1500, and reinsert and/or tighten the locking pin 1460. For example, the pin hole 1414 of the main plate 1410 may be aligned with the second pin hole 1524 of the mounting frame 1500 to change or adjust a position of the support assembly 1400 and thus foot support 1100.

Although a wheel loader machine 1 is described as an example of the mobile industrial machine, aspects disclosed herein may be used with other mobile machines such as a compactor, tractor, wheel loader, wheel tractor-scraper, skid-steer and compact track loader, track loader, off-highway truck, excavator, forest machine, articulated truck, cold planer, dozer, mining excavator, material handler, motor grader, pipeplayer, road reclaimer, telehandler, paver, backhoe loader, etc. Aspects disclosed herein may provide an adaptable pedal that may be installed in a variety of vehicles or other installation environments.

Technical aspects disclosed herein may enhance operator ergonomics by providing an arc-shaped path or arc-shaped motion for a floor-mounted foot pedal. The motion of the foot pedal, along with an arrangement of a housing and support assembly, may be less vulnerable to disruption from outside materials like mud gathering at a front of the foot pedal. Technical aspects disclosed herein may provide a more versatile pedal with a comfortable range of motion and include benefits of wall-mounted or suspended pedals. Technical aspects disclosed herein may facilitate aft adjustment of the foot pedal based on an operator's preference.

It will be apparent to those skilled in the art that various modifications and variations can be made to the disclosed system without departing from the scope of the disclosure. Other embodiments of the system will be apparent to those skilled in the art from consideration of the specification and practice of the system disclosed herein. It is intended that the specification and examples be considered as exemplary only, with a true scope of the disclosure being indicated by the following claims and their equivalents.

For example, aspects disclosed herein are not limited to a configuration of the coupler 1120, and the coupler 1120 may alternatively rigidly fix or bolt the foot support 1100 to the arm 1200 instead of allowing a pivot motion. In addition, even though the floor surface 306 of the cab 300 (FIG. 1) is shown to be horizontal, the floor surface 306 and/or another installation surface of the foot pedal 1000 may be formed at an angle, and the first plate 1510 may be parallel to the installation surface, and the second plate 1520 may not be exactly perpendicular to the first plate 1510. In addition, a number of pin holes 1522, 1524, 1526 in the mounting frame 1500 and the connection rail 1450 are not limited to three, and more or less pin holes may be provided to increase or decrease a number of adjustment position. The main plate 1410 may alternatively have multiple pin holes 1414 configured to align with the pin holes 1522, 1524, and 1526 of the mounting frame 1500 used with multiple locking pins 1460 to further secure the main plate 1410. As another example, the main plate 1410 and the connection rail 1450 may have different sliding, rail, or engagement structures (e.g., the connection rail 1450 may include a rack, and a rear of the main plate 1410 may include a gear to engage with the rack) to facilitate a movement of the main plate 1410. As another alternative, the connection rail 1450 may be formed integrally with the second plate 1520 of the mounting frame 1500, and/or the connection rail 1450 may be omitted, and the second plate 1520 of the mounting frame 1500 may be configured to directly engage with the main plate 1410.

What is claimed is:

1. A foot pedal for a mobile machine, comprising:
   a foot support;
   an arm having a first end coupled to the foot support and a second end opposite the first end, the arm having a change in curvature, a concave side, and a convex side opposite the concave side; and
   a mounting frame mounted to a horizontal floor surface, wherein the convex side faces the horizontal floor surface.

2. The foot pedal of claim 1, wherein the arm is moveable along an arc-shaped path above the horizontal floor surface, the arc-shaped path having a radius of curvature defined by an arc shape of the arm.

3. The foot pedal of claim 1, further comprising a support assembly, wherein the arm is moveable with respect to the support assembly, the arm includes a guide slot, and the support assembly includes a guide pin disposed in the guide slot, the guide pin and the guide slot defining a range of motion of the arm.

4. The foot pedal of claim 1, further comprising a spring having a first end engaging the second end of the arm, the spring being compressed by movement of the foot support and the arm toward the spring.

5. The foot pedal of claim 4, further comprising a housing, wherein a second end of the spring opposite the first end of the spring engages an inner surface of the housing.

6. The foot pedal of claim 1, further comprising a support assembly including a main plate extending in a vertical direction and a plurality of rollers coupled to the main plate, wherein the plurality of rollers are configured to guide, with respect to the support assembly, a sliding motion of the arm.

7. The foot pedal of claim 6, wherein the plurality of rollers includes an upper roller disposed on the concave side of the arm and a pair of lower rollers disposed on the convex side of the arm.

8. The foot pedal of claim 6, wherein a position of the support assembly, with respect to the mounting frame, is adjustable.

9. The foot pedal of claim 1, wherein the mounting frame includes a first plate extending in a first direction and configured to be mounted to the horizontal floor surface and a second plate extending in a second direction.

10. The foot pedal of claim 9, further comprising a support assembly extending in the second direction, the arm being slidable with respect to the support assembly, and the support assembly including a main plate moveable with respect to the second plate.

11. The foot pedal of claim 10, further comprising a pin, wherein the main plate includes a pin hole, the second plate includes a plurality of pin holes, and the pin is insertable through the pin hole of the main plate and into one of the pin holes of the second plate to set a position of the main plate with respect to the second plate.

12. The foot pedal of claim 10, further comprising a connection rail fixed to the second plate of the mounting frame and having a rail-shaped contour, wherein the main plate is slidable, with respect to the connection rail, via the rail-shaped contour.

13. The foot pedal of claim 1, wherein the foot support is pivotable with respect to the arm.

14. The foot pedal of claim 1, wherein the arm is moveable along an arc-shaped path.

15. A foot pedal for a mobile machine, comprising:
    a foot support;
    an arm having a first end coupled to the foot support and a second end opposite the first end, the arm having a change in curvature, a concave side, and a convex side opposite the concave side;
    a support assembly including a main plate, a first roller, and a second roller, wherein the arm is slidable between the first roller and the second roller in a first direction; and
    a mounting frame coupled to the support assembly, wherein the main plate is moveable relative to the mounting frame, in the first direction, to adjust a position of the main plate with respect to the mounting frame.

16. A mobile machine, comprising:
    a body;
    a plurality of wheels coupled to the body; and
    a cab, including:
      a floor surface, and
      a foot pedal installed at the floor surface, wherein the foot pedal includes:
        a foot support,
        an arm coupled to the foot support, the arm having a change in curvature,
        a support assembly configured to guide motion of the arm above the floor surface, and
        a mounting frame coupled to the support assembly and the floor surface.

17. The mobile machine of claim 16, wherein the arm an arc shape, a concave side, and a convex side opposite the concave side, wherein the convex side faces and is convex with respect to the floor surface.

18. The mobile machine of claim 17, wherein the support assembly includes a plurality of rollers, the arm being moveable between the plurality of rollers, and at least one roller of the plurality of rollers including a sensor in communication with a drive system of the mobile machine.

19. The mobile machine of claim 16, further comprising a connection rail fixed to the mounting frame, wherein the support assembly includes a main plate being slidable, with respect to the connection rail, to adjust a position of the main plate relative to the mounting frame.

20. The mobile machine of claim 16, further comprising a spring engaged with the arm.

\* \* \* \* \*